(12) United States Patent
Hager

(10) Patent No.: US 10,524,448 B2
(45) Date of Patent: Jan. 7, 2020

(54) CATTLE SQUEEZE CHUTE DOOR OPENING ASSEMBLY

(71) Applicant: Sioux Steel Company, Sioux Falls, SD (US)

(72) Inventor: Garry R. Hager, Galesburg, IL (US)

(*) Notice: Subject to any disclaimer, the term of this patent is extended or adjusted under 35 U.S.C. 154(b) by 454 days.

(21) Appl. No.: 15/362,990

(22) Filed: Nov. 29, 2016

(65) Prior Publication Data
US 2018/0146639 A1  May 31, 2018

(51) Int. Cl.
*A01K 1/06* (2006.01)
*E05F 11/54* (2006.01)
*E05F 7/02* (2006.01)

(52) U.S. Cl.
CPC .......... *A01K 1/0613* (2013.01); *E05F 7/02* (2013.01); *E05F 11/54* (2013.01); *E05Y 2900/40* (2013.01)

(58) Field of Classification Search
CPC .. A01K 1/0613; A01K 1/0017; A01K 1/0023; E05D 15/565; E05F 11/54; E05F 7/02; E06B 11/02; E05Y 2900/40
See application file for complete search history.

(56) References Cited

U.S. PATENT DOCUMENTS

| | | | | |
|---|---|---|---|---|
| 3,135,240 A * | 6/1964 | Hickman | ............. | A01K 1/0613 119/735 |
| 3,792,686 A * | 2/1974 | Needham | ............. | A01K 1/12 119/14.03 |
| 5,111,773 A * | 5/1992 | Akins | ............. | A01K 1/0613 119/523 |
| 5,628,284 A * | 5/1997 | Sheen | ............. | A01K 1/0023 119/840 |
| 5,803,015 A * | 9/1998 | Rhodes | ............. | A01K 1/12 119/14.02 |
| 6,837,190 B2 * | 1/2005 | Thibault | ............. | A01K 1/0017 119/840 |
| 7,640,891 B2 * | 1/2010 | Van Liere | ............. | A01K 1/0017 119/518 |
| 8,745,922 B1 * | 6/2014 | Matsuda | ............. | A01K 1/0017 49/236 |
| 2013/0326959 A1 * | 12/2013 | Gipson | ............. | A01K 1/0613 49/357 |
| 2015/0040834 A1 * | 2/2015 | Loos | ............. | A01K 1/0209 119/518 |
| 2015/0359233 A1 * | 12/2015 | Callicrate | ............. | A22B 1/00 452/55 |

* cited by examiner

*Primary Examiner* — Trinh T Nguyen

(57) ABSTRACT

A cattle squeeze chute door opening assembly includes a cattle squeeze chute including a lateral wall that has an open end for having an animal extending therethrough. A door frame is attached to the cattle squeeze chute adjacent to the open end. The door frame includes a door support post spaced from the lateral wall. A space between the lateral wall and the door support post defines an access portal. The door frame including an upper frame member and a lower frame member. A gate is pivotally couple to door support post and is positionable in an open position or in a closed position. The gate has a lower edge positioned adjacent to the lower frame member. A foot actuator is mounted on the door frame. The gate is lifted upwardly and moved from a closed position to an open position when the foot actuator is actuated.

9 Claims, 5 Drawing Sheets

CATTLE SQUEEZE CHUTE DOOR OPENING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to door opening devices and more particularly pertains to a new door opening device for hands free opening a side gate of a cattle squeeze chute by way of a foot actuated opening mechanism.

BRIEF SUMMARY OF THE INVENTION

An embodiment of the disclosure meets the needs presented above by generally comprising a cattle squeeze chute including a lateral wall that has an open end configured for has an animal extending therethrough. A door frame is attached to the cattle squeeze chute adjacent to the open end. The door frame includes a door support post spaced from the lateral wall. A space between the lateral wall and the door support post defines an access portal. The door frame including an upper frame member and a lower frame member. A gate is pivotally couple to door support post and is positionable in an open position or in a closed position. The gate has a lower edge positioned adjacent to the lower frame member. A foot actuator is mounted on the door frame. The gate is lifted upwardly and moved from a closed position to an open position when the foot actuator is actuated.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
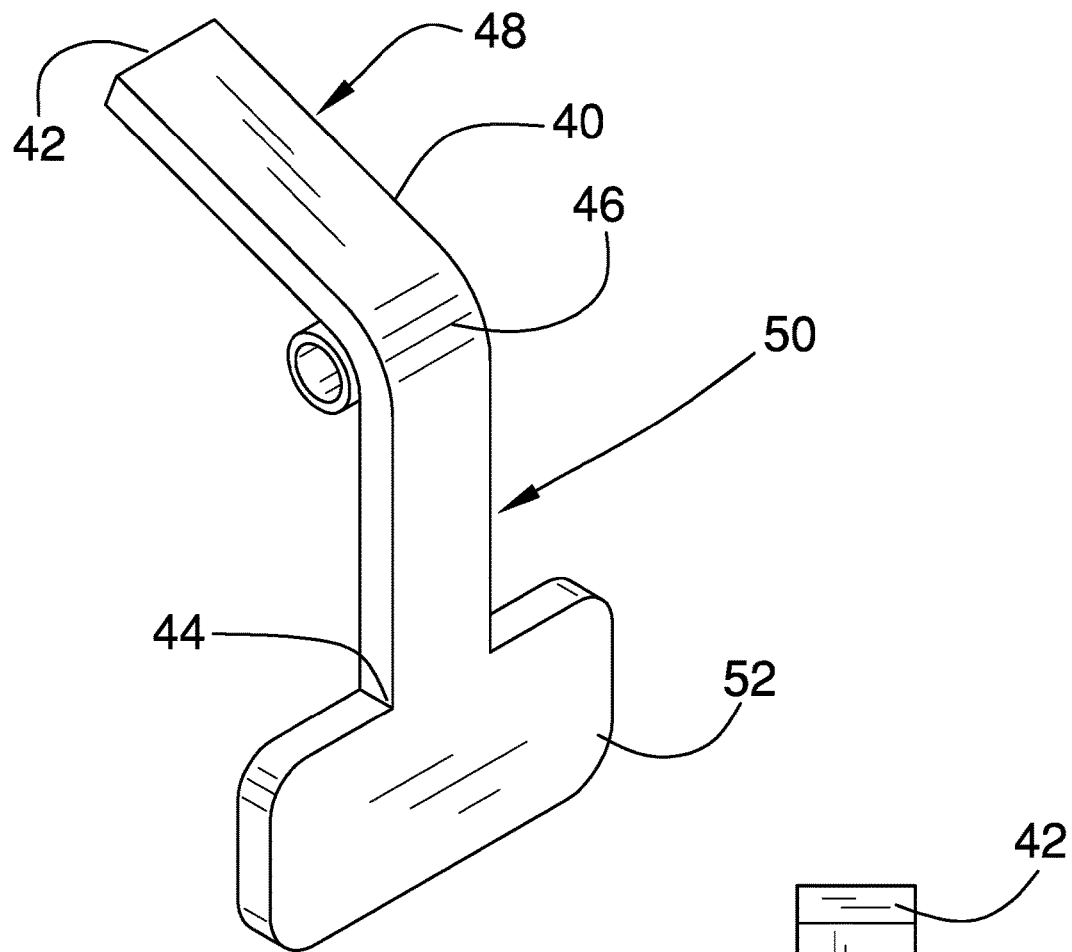
FIG. 1 is a perspective view of a cattle squeeze chute door opening assembly according to an embodiment of the disclosure.
Figure 2:
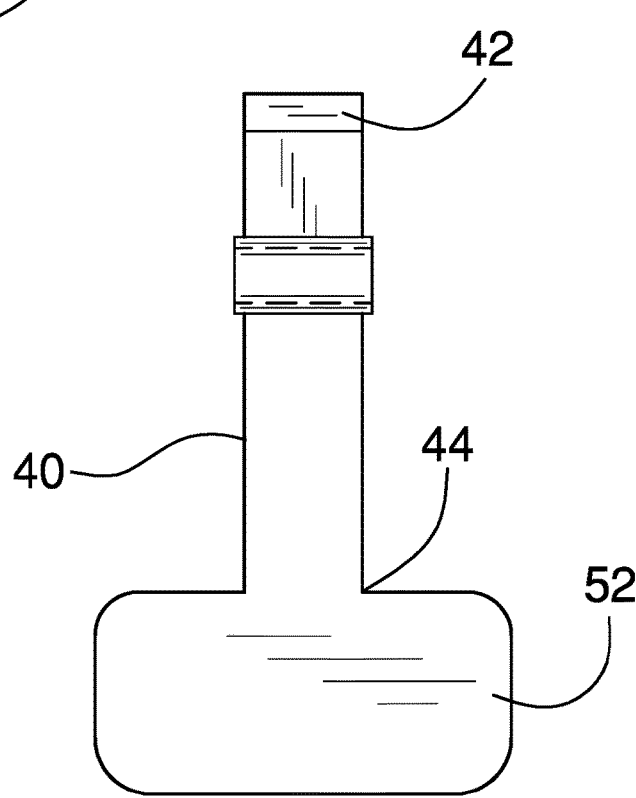
FIG. 2 is a front view of an embodiment of the disclosure.
Figure 3:
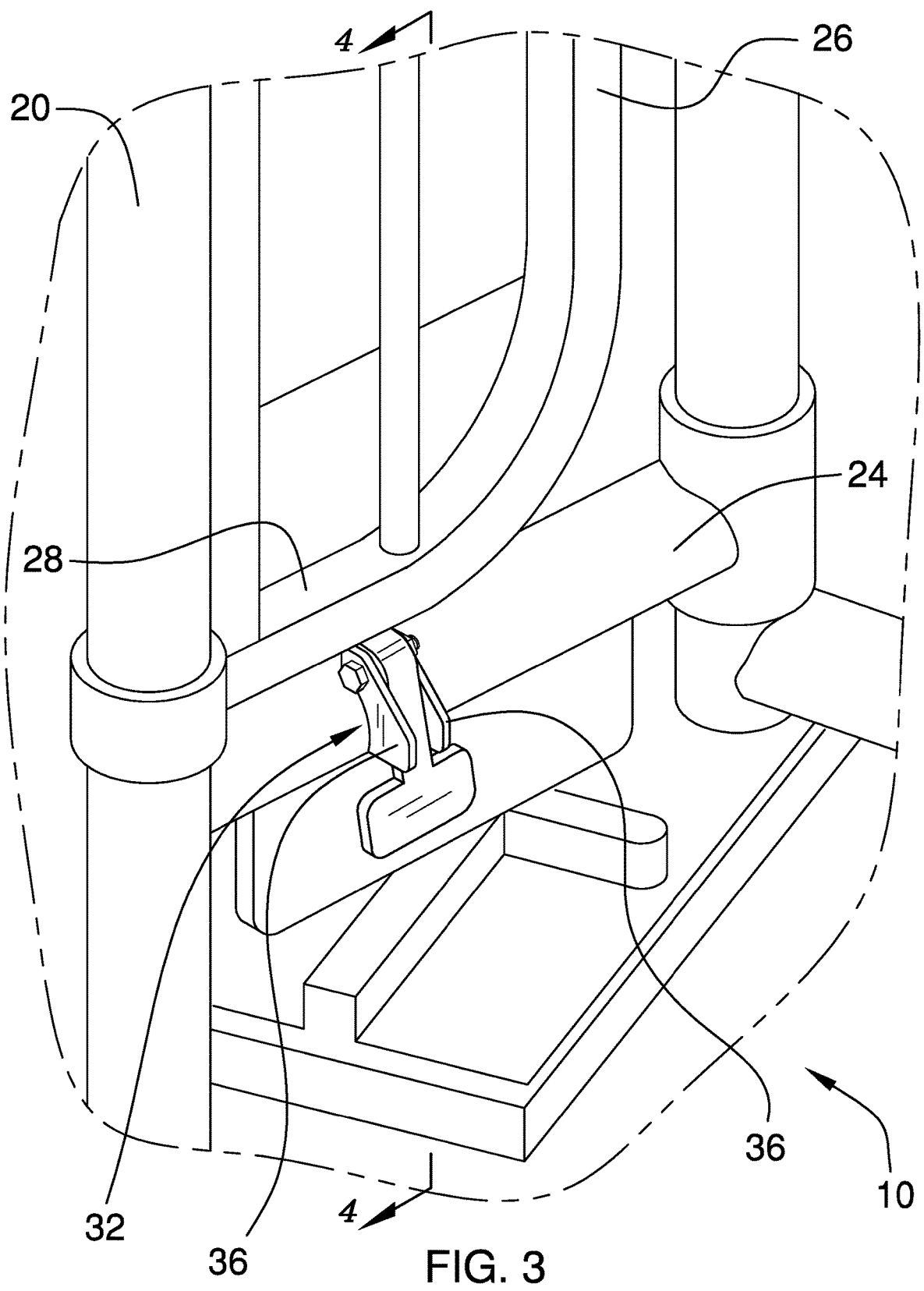
FIG. 3 is a perspective view of an embodiment of the disclosure.
Figure 4:
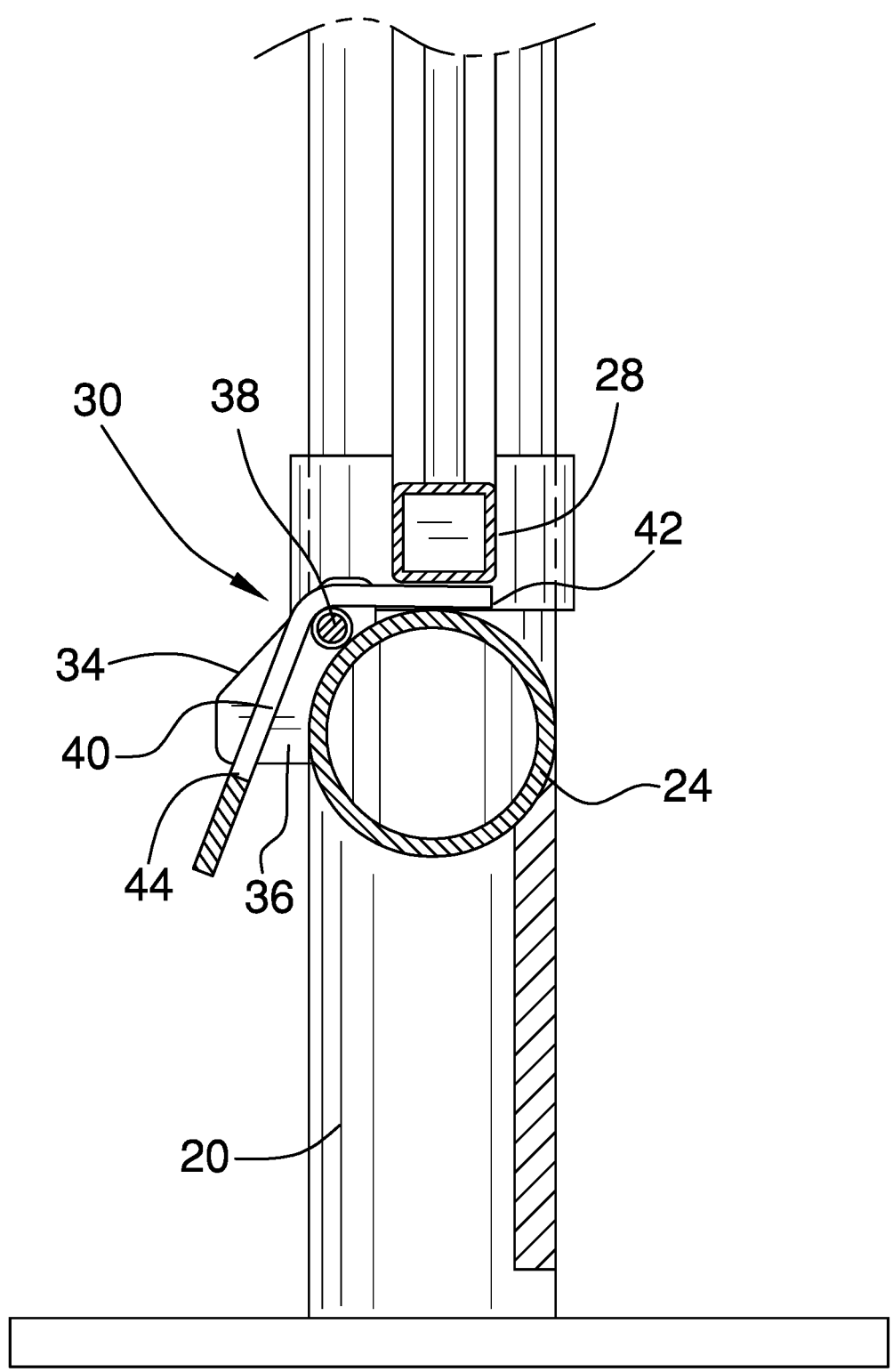
FIG. 4 is a cross-sectional view of an embodiment of the disclosure taken along line 4-4 of FIG. 3.

With reference now to the drawings, and in particular to FIGS. 1 through 6 thereof, a new door opening device embodying the principles and concepts of an embodiment of the disclosure and generally designated by the reference numeral 10 will be described.

As best illustrated in FIGS. 1 through 6, the cattle squeeze chute door opening assembly 10 generally comprises a cattle squeeze chute 12 including a lateral wall 14 having an open end 16 configured for having an animal extending therethrough. A door frame 18 is attached to the cattle squeeze chute 12 adjacent to the open end 16. The door frame 18 includes a door support post 20 spaced from the lateral wall 14. A space between the lateral wall 14 and the door support post 20 defines an access portal and the door frame 18 includes an upper frame member 22 and a lower frame member 24. A gate 26 is pivotally couple to the door frame 18 and is positionable in an open position or in a closed position. The gate 26 is pivotally coupled to the door support post 20 and the gate 26 has a lower edge 28 positioned adjacent to the lower frame member 24. The above describes a typical, conventional cattle squeeze chute 12 which is used for inspecting and treating cattle by holding them in place with movable lateral walls and which will include various doors that can be opened to access multiple areas of the animal.

In particular, the gate 26 described above is used for access areas around the head of the animal. The gate 26 is often configured so that as it is placed in a closed position it falls downwardly into a slot along its hinge. This retains it in the closed position. In order to open the gate 26, it must be lifted and rotated out of the door frame 18. This structure provides protection for the person using the cattle squeeze chute by preventing accidental opening of the gate 26. However, the person requiring opening of the gate 26 is often a veterinarian or other person holding various medical monitoring devices, needles with vaccinations and other articles required for treatments and health assessments. Because of this, opening the gate 26 can be difficult as the person will not have a free hand readily available for gripping, lifting and rotating the gate 26. To this end, the assembly 10 includes a foot actuator 30 that is mounted on the lower frame member 24. The gate 26 is lifted and moved from a closed position to an open position when the foot actuator 30 is actuated.

The foot actuator 30 comprises a mount 32 that is attached to the lower frame member 24. The mount 32 has a distal edge 34 spaced laterally from the lower frame member 24. The distal edge 34 is formed into an upwardly angled slope. This allows the gate 26 to slide upwardly on the distal edge 34 as it is being closed and then falls off of the distal edge 34 into a locked position. The distal edge 34 urges the gate 26 upwardly as the gate 26 is moved from the open position to the closed position. The mount 32 may include a pair of spaced support plates 36 and an axle 38 is attached to and extends between the support plates 36.

Figure 5:
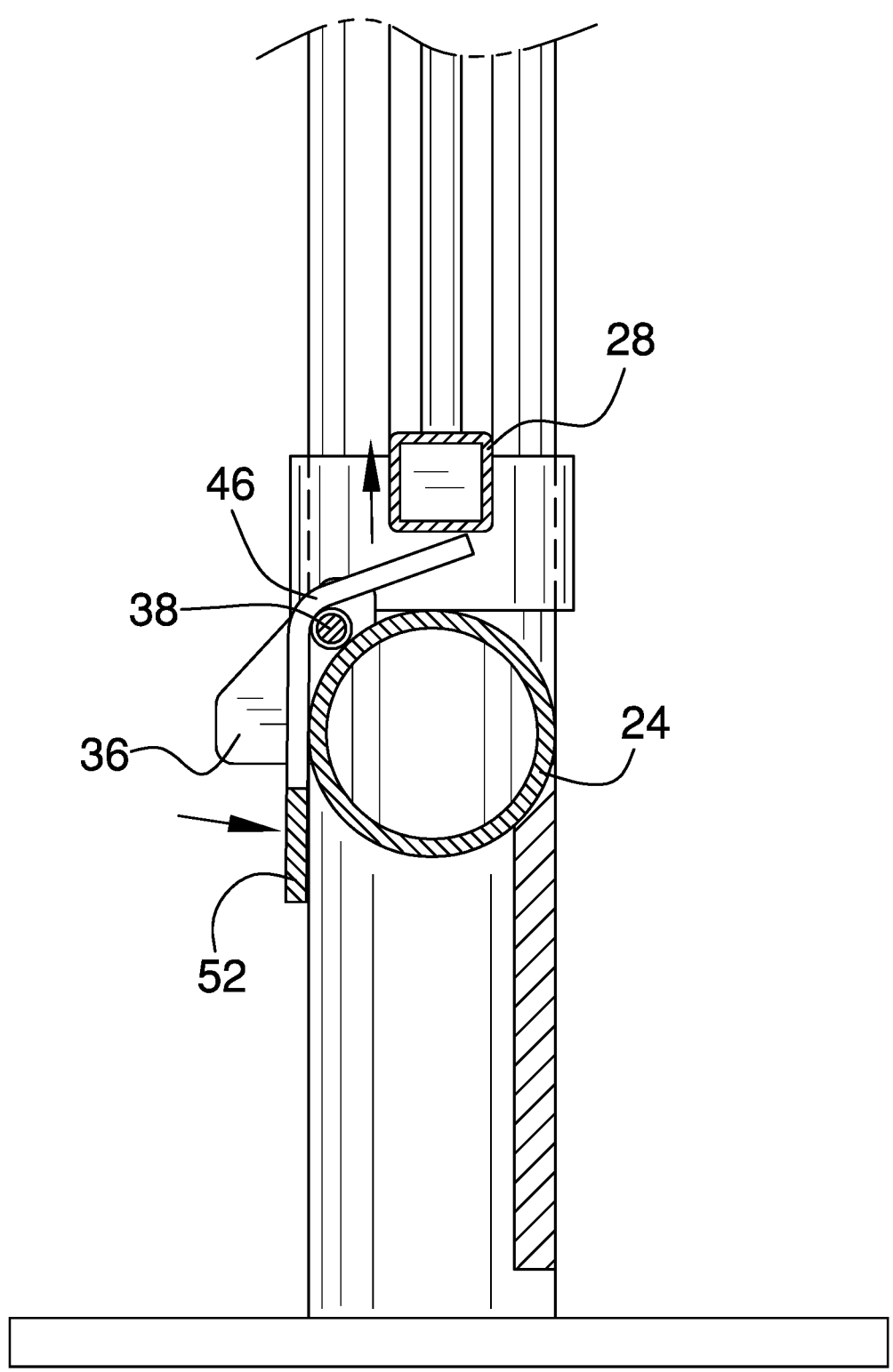
FIG. 5 is a cross-sectional view of an embodiment of the disclosure.
Figure 6:
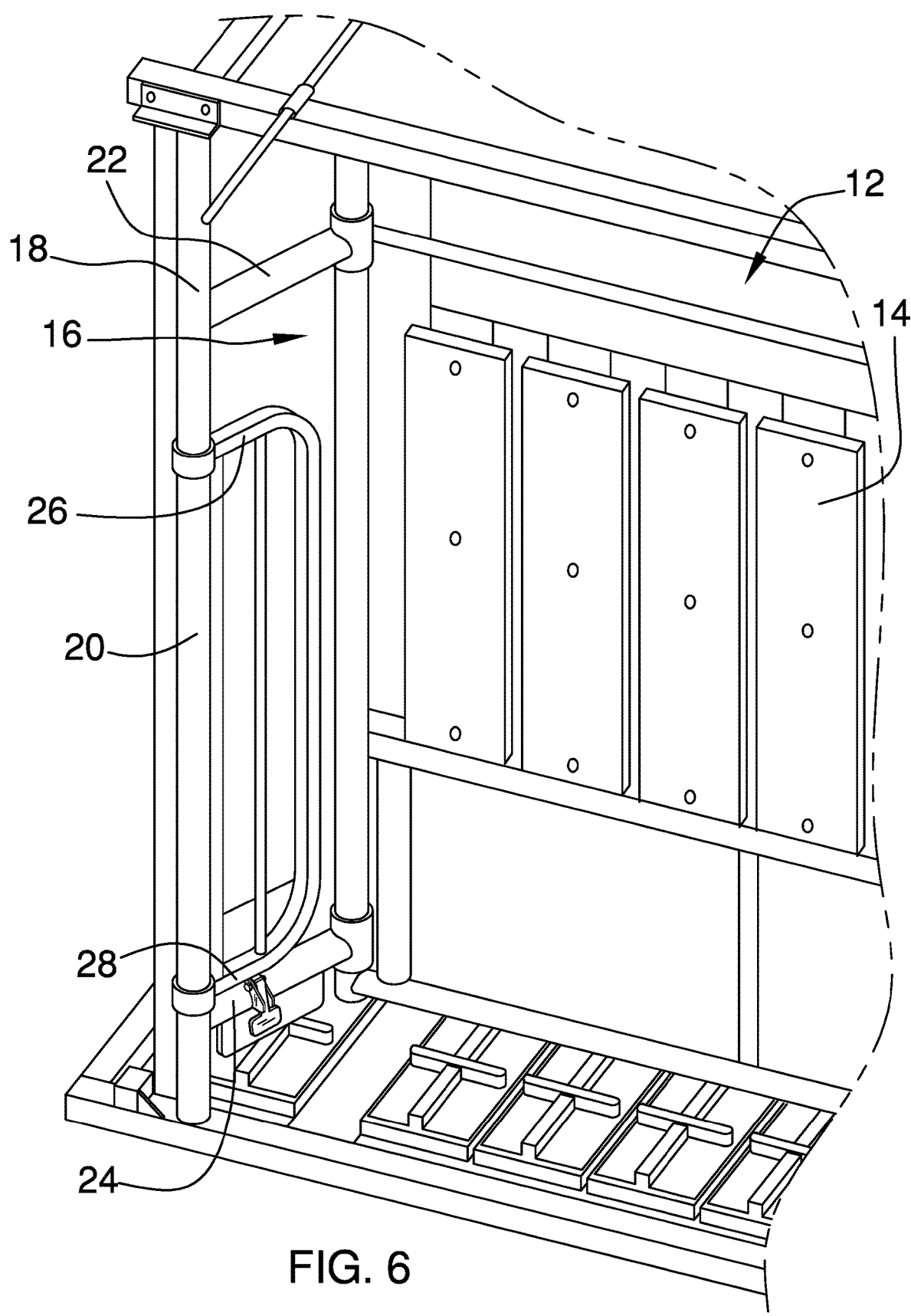
FIG. 6 is a perspective view of an embodiment of the disclosure.

A lift plate 40 has a first end 42 and a second end 44. The lift plate 40 is pivotally coupled to the mount 32 so that the lift plate 40 extends over the lower frame member 24. In this position, the gate 26 is positioned over the lift plate 40 adjacent to the first end 42 when the gate 26 is in the closed position. The second end 44 extends away from the mount 30 and the first end 42 is moved upwardly when the second end 44 is moved downwardly. The lift plate 40 lifts the gate 36 upwardly when the second end 44 is moved downwardly. The gate 26 is also rotated outwardly of the door frame 18 when the first end 42 is lifted upwardly. The rotation may happen by one or both of two ways. First, the lift plate 40 may frictionally engage the gate 26 and thus the gate 26 will rotate with respect to the door support post 18 as the lift plate 40 rotates with respect to the lower frame member. Second, the lift plate 40 will generally be in a horizontal orientation as it extends under the gate 26 when the gate 26 is in the closed position. Therefore, the lift plate 40 will be angled downwardly from the first end 42 as the first end 42 travels upwardly as shown in FIG. 5 which will allow the gate 26 to slide down the lift plate 40 as it is removed from its locked position.

The lift plate 40 is pivotally coupled to the axle 38 to allow the lift plate 40 to pivot relative to the lower frame member 24. The lift plate 40 has a bend 46 therein positioned between the first 42 and second 44 ends and adjacent to the axle 38. The bend 46 forms an obtuse angle in the lift plate 40 such that the first portion 48 of the lift plate 40 is defined between the bend 46 and the first end 42 and a second portion 50 of the lift plate 40 is defined between the bend 46 and the second end 44. The second portion 50 is angled downwardly and away from the door frame 18 when the first portion 48 is horizontally orientated. A foot plate 52 being attached to the second end 44 to facilitate engagement between the lift plate 40 and a person's foot. The lift plate 40 may have a length between 5.0 inches and 10.0 inches and a width typically between 0.75 inches and 2.0 inches. The foot plate 52 will typically have a width greater than 2.0 inches and a length greater than 1.0 inches.

In use, the cattle squeeze chute 12 is used in a conventional manner for holding and inspecting livestock and in particular cattle. However, when the gate 26 requires opening for access to areas near the animal's head, the lift plate 40 may be actuated to lift the gate 26 upwardly out of its locked position so that it will swing open without the need for the user to physically grip and lift the gate 26. This allows the user to hold in their hands a variety of articles required for medical treatments and examinations while opening the gate.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A gate opening assembly including:
   a cattle squeeze chute including a lateral wall having an open end configured for having an animal extending therethrough;
   a door frame being attached to said cattle squeeze chute adjacent to said open end, said door frame including a door support post spaced from said lateral wall, a space between said lateral wall and said door support post defining an access portal, said door frame including an upper frame member and a lower frame member;
   a gate being pivotally coupled to said door frame, said gate being positionable in an open position or in a closed position, said gate being pivotally coupled to said door support post, said gate having a lower edge positioned adjacent to said lower frame member; and
   a foot actuator being mounted on said door frame, said gate being lifted upwardly and moved from a closed position to an open position when said foot actuator is actuated, said foot actuator comprising
      a mount being attached to said lower frame member, and
      a lift plate having a first end and a second end, said lift plate being pivotally coupled to said mount, said lift plate extending over said lower frame member such that said gate is positioned over said plate adjacent to said first end when said gate is in said closed position, said second end extending away from said mount, said first end being moved upwardly when said second end is moved downwardly, said lift plate lifting said gate upwardly when said second end is moved downwardly, said gate being rotated outwardly of said door frame when said first end is lifted upwardly.

2. The gate opening assembly according to claim 1, wherein said foot actuator is positioned adjacent to said lower frame member.

3. The gate opening assembly according to claim 1, wherein said foot actuator engages said lower edge of said gate when said foot actuator is actuated.

4. The gate opening assembly according to claim 1, wherein:
   said mount including a pair of spaced support plates;
   an axle being attached to and extending between said support plates, said lift plate being pivotally coupled to said axle.

5. The gate opening assembly according to claim 4, wherein said lift plate has a bend therein positioned between said first and second ends and adjacent to said axle, said bend forming an obtuse angle in said lift plate such that said first portion of said lift plate is defined between said bend and said first end and a second portion of said lift plate is defined between said bend and said second end, said second portion being angled downwardly and away from said door frame when said first portion is horizontally orientated.

6. The gate opening assembly according to claim 1, further including a foot plate being attached to said second end.

7. The gate opening assembly according to claim 1, wherein said mount has a distal edge spaced laterally from said lower frame member, said distal edge being formed into an upwardly angled slope, said distal edge urging said gate upwardly as said gate is moved from said open position to said closed position.

8. The gate opening assembly according to claim 4, further including a foot plate being attached to said second end.

9. The gate opening assembly according to claim 8, wherein said mount has a distal edge spaced laterally from said lower frame member, said distal edge being formed into an upwardly angled slope, said distal edge urging said gate upwardly as said gate is moved from said open position to said closed position.

* * * * *